(12) United States Patent
Lee et al.

(10) Patent No.: US 9,107,395 B2
(45) Date of Patent: Aug. 18, 2015

(54) CONTROL DEVICE, AND METHOD, FOR CONTROLLING THE LOCATION OF AN ANIMAL

(75) Inventors: Caroline Lee, Invergowrie (AU); Matthew Reed, Armidale (AU); Tim Wark, The Gap (AU); Christopher Crossman, Moggil (AU); Philip Valencia, Brendale (AU)

(73) Assignee: COMMONWEALTH SCIENTIFIC AND INDUSTRIAL RESEARCH ORGANISATION, Australian Capital Territory (AU)

( * ) Notice: Subject to any disclaimer, the term of this patent is extended or adjusted under 35 U.S.C. 154(b) by 89 days.

(21) Appl. No.: 13/055,803

(22) PCT Filed: Jul. 24, 2009

(86) PCT No.: PCT/AU2009/000943
§ 371 (c)(1),
(2), (4) Date: Apr. 18, 2011

(87) PCT Pub. No.: WO2010/009509
PCT Pub. Date: Jan. 28, 2010

(65) Prior Publication Data
US 2012/0111286 A1   May 10, 2012

(30) Foreign Application Priority Data

Jul. 25, 2008   (AU) .................................. 2008903820

(51) Int. Cl.
*A01K 29/00*   (2006.01)
*A01K 11/00*   (2006.01)

(52) U.S. Cl.
CPC ............. *A01K 29/005* (2013.01); *A01K 11/008* (2013.01)

(58) Field of Classification Search
CPC .............................. A01K 15/02; A01K 15/04
USPC .............. 119/712, 719, 720, 721; 340/573.1, 340/539.13
See application file for complete search history.

(56) References Cited

U.S. PATENT DOCUMENTS 5,857,433 A * 1/1999 Files ............................. 119/720
6,043,747 A * 3/2000 Altenhofen ................ 340/573.1
(Continued)

FOREIGN PATENT DOCUMENTS

WO   WO 2006/007643   1/2006

OTHER PUBLICATIONS

International Search Report for PCT/AU2009/000943, mailed Aug. 24, 2009.
(Continued)

*Primary Examiner* — Richard Price, Jr.
(74) *Attorney, Agent, or Firm* — Nixon & Vanderhye P.C.

(57) ABSTRACT

A control device and method controls an animal's location. A GPS receiver and a processor determine the position, velocity and heading direction of the animal relative to a target. A stimulus unit selectively applies a stimulus to the animal. If the position of the animal relative to the target is less than a predetermined distance and the animal's velocity relative to the target is within a predetermined range and the heading direction of the animal is within a predetermined orientation relative to the target, then a non-aversive stimulus is applied to the animal, and removal of a non-aversive stimulus is selectively effected when the animal's velocity relative to the target is outside of the predetermined range, or the heading direction of the animal changes by more than a predetermined amount, otherwise the non-aversive stimulus is first removed followed by application of an aversive stimulus to the animal.

23 Claims, 2 Drawing Sheets

(56) References Cited

U.S. PATENT DOCUMENTS

| | | | |
|---|---|---|---|
| 6,232,880 | B1 | 5/2001 | Anderson et al. |
| 6,252,336 | B1 * | 6/2001 | Hall .............................. 310/339 |
| 6,271,757 | B1 * | 8/2001 | Touchton et al. .......... 340/573.1 |
| 6,868,100 | B2 * | 3/2005 | Larson et al. ................... 372/20 |
| 7,034,695 | B2 * | 4/2006 | Troxler ..................... 340/573.4 |
| 7,602,302 | B2 * | 10/2009 | Hokuf et al. ............... 340/573.3 |
| 2002/0046713 | A1 | 4/2002 | Otto |

OTHER PUBLICATIONS

Written Opinion for PCT/AU2009/000943, mailed Aug. 24, 2009.

* cited by examiner

CONTROL DEVICE, AND METHOD, FOR CONTROLLING THE LOCATION OF AN ANIMAL

CROSS-REFERENCE TO RELATED APPLICATIONS

This application is the U.S. national phase of International Application No. PCT/AU2009/000943 filed 24 Jul. 2009 which designated the U.S. and claims priority to Australian Patent Application No. 2008903820 filed 25 Jul. 2008, the entire contents of each of which are hereby incorporated by reference.

TECHNICAL FIELD

The present invention provides a control device, and method, for controlling the location of an animal. The present invention is particularly concerned with the virtual fencing of an animal or a herd of animals.

BACKGROUND ART

Conventional fencing controls for controlling livestock are losing popularity primarily due to the cost of installing, and maintaining, posts and strainers together with often hundreds of kilometers of barbed (or electric) wire. Flash floods, more prevalent with changing climatic conditions often wipe out large sections of fencing. In addition conventional fences are spatially fixed, which limits dynamic flexible management of herds of animals or land.

Virtual fencing is a more recent technology designed to overcome the disadvantages of conventional fencing. Virtual fencing devices in various forms including collar halter devices are being trialled which incorporate GPS receivers to locate an animal's position together with a stimulus emitting device to deliver a stimulus to the animal when it is in proximity to a virtual fence line. However many such devices do not take into account the behavior or welfare of the animal. Certain such devices can have the opposite effect intended, of driving an animal into a virtually fenced off area.

Any discussion of documents, acts, materials, devices, articles or the like which has been included in the present specification is solely for the purpose of providing a context for the present exemplary embodiments. It is not to be taken as an admission that any or all of these matters form part of the prior art base or were common general knowledge in the field relevant to the present exemplary embodiments as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

The present exemplary embodiment provides a control device for controlling the location of an animal, the control device comprising:
 a GPS receiver for receiving GPS signals;
 a processor communicatively coupled to the GPS receiver and operable to continuously determine the position, velocity and heading direction of the animal relative to a target;
 a stimulus unit for selective application of a stimulus to the animal in response to signals received from the processor;

where the processor is programmable such that if the position of the animal relative to the target is less than a predetermined distance and the velocity of the animal relative to the target is within a predetermined range and the heading direction of the animal is within a predetermined orientation relative to the target, then a signal indicative of applying a non-aversive stimulus to the animal is generated, and the processor is selectively programmable such that when the velocity of the animal relative to the target is outside of the predetermined range, or the heading direction of the animal changes by more than a predetermined amount a signal indicative of removal of the non-aversive stimulus is generated otherwise a signal is generated indicative of first removing the non-aversive stimulus followed by application of an aversive stimulus to the animal.

A non-aversive stimulus is defined to be a stimulus which is not perceived negatively by the animal. It is a stimulus which is not in itself either painful, discomforting, stressful, unpleasant, noxious or any other attribute causing the animal to want to avoid it.

An additional heading direction detection means may be provided for detecting, or refining, the heading direction of the animal and providing a corresponding heading signal. The additional heading direction detecting means may comprise at least one terrestrial magnetism sensor, a magnetic compass, an additional GPS receiver, an electronic compass, or other suitable sensor to detect the heading direction of the animal.

The target may be a static target such as, but not limited to a point, one or more lines, which such one or more lines may be arranged to form a fixed virtual fence. Optionally the target may be a dynamic target, such as, but not limited to a virtual fence whose boundaries are gradually shifted to accommodate for rotational grazing or other purposes. The dynamic target may be an animal. The target may be one or more thresholds.

In one embodiment the velocity of the animal relative to the target is determined by differentiating position data. Carrier-phase derived Doppler measurements or receiver-generated Doppler measurements may be utilised. Optionally, or in addition, the control device may further comprise an accelerometer, and/or a gyroscope, communicatively coupled to the processor to detect small changes in the velocity of the animal. In such an embodiment the processor may be operable to receive accelerometer signals and provide updated position data for the control device, to adjust for lag or error of the GPS to more precisely determine the animal's position.

The accelerometer may be one of a number of acceptable accelerometer types. Such types include, without limitation, piezoelectric, capacitance, null-balance, strain gage, resonance, piezo-resistive and magnetic induction. The accelerometer may have multiple axes. In an embodiment which includes a gyroscope, the gyroscope may be a MEMs based gyroscope. It will be appreciated that both an accelerometer and an inertial gyro sensor may be incorporated into a single sensor.

The control device may further comprise a tilt sensor implemented by a two-axis accelerometer tilt sensor and/or a 3-axis gyroscope. The tilt sensor may additionally be used to increase the control device's accuracy in determining the heading direction of the animal.

The control device may further comprise a memory unit to store spatial and temporal comparison parameters, such parameters including target information comprising:
 co-ordinate data representative of the target,
 an upper and a lower limit of the predetermined velocity range relative to the target, an upper and a lower limit of the predetermined orientation of the animal relative to the target, a maximum duration of application of the non-aversive stimulus, and a maximum duration of application of the stimulus.

The upper limit of the predetermined velocity range is preferably set at just below speed at which the animal is deemed to be in a state of distress. The lower limit of the predetermined velocity range is preferably dictated by the speed at which the animal is deemed to be grazing.

The memory unit may be provided in the form of one or more of a memory card, processor or board, or other form of data storage. Target information may be manually entered into the memory by means of, but not limited to wired interface delivery or wireless interface delivery.

In one embodiment the control device further comprises a transceiver in communication with the processor and the memory unit to remote receive target information.

The processor and memory may be combined in a single unit, such as a portable computing device.

Variable data comprising one or more of the position and speed at which the animal is moving relative to the target, the heading direction of the animal relative to the target, the extent of application of an aversive and non-aversive stimulus applied to the animal as a function of time, may processed at a desired frequency and stored in memory.

In an embodiment in which the control device comprises a transceiver, variable data may be wirelessly transmitted to a base station.

The stimulus unit may comprise a non-aversive stimulus unit and a separate aversive stimulus unit. Preferably the non-aversive stimulus unit administers a non-aversive stimulus comprising a tone which is audible to the animal. The tone may or may not be audible to a human. Optionally, or in addition, the non-aversive stimulus unit may administer a vibrational stimulus. Preferably the aversive stimulus unit administers an electrical stimulus. The intensity of each stimulus which may be applied to an animal is preferably variable.

The aversive stimulus unit may comprise two or more electrodes for electrical contact with the skin of the animal.

In an embodiment in which the processor and memory are combined in a single unit, such as a portable computing device, the unit may comprise a sound generator and the non-aversive stimulus unit may comprise an amplifier and speaker unit.

Preferably the control device further includes a power supply for powering the processor. The power supply may be in the form of a replaceable battery pack. Optionally the power supply may be in the form of a rechargeable battery, rechargeable by solar means, preferably flexible solar cells, or rechargeable by using the potential electrical energy generated by the animal's movement. A piezoelectric battery may be used, implanted in an appropriate manner that would permit a large muscle to act upon a piezoelectric element thereby converting the mechanical energy into electrical energy to provide a recharge to the battery. Optionally a generator may be coupled to one or more joints of the animal for converting the energy associated with the motion of the joint(s) into corresponding electrical energy.

The processor may be in the form of an FPGA.

The control device may further comprise a DGPS receiver coupled with the processor for receiving differential GPS signals.

The control device may further comprise a head angle measurement device coupled with the processor for measuring the head angle of the animal relative to a reference position and/or orientation.

The control device is preferably adapted to be fitted to an animal. The control device may be worn externally by an animal and mounted on, or incorporated into, a collar or ear tag or other headwear. Optionally the control device may be implanted into the animal.

In an embodiment, the application of the aversive stimulus to the animal may immediately follow removal of the non-aversive stimulus.

In an embodiment, the processor may be further programmable such that on the condition that a predetermined time has lapsed, the signal is generated which is indicative of first removing the non-aversive stimulus followed by application of an aversive stimulus to the animal. The aversive stimulus is preferably applied for a set duration.

The processor preferably executes software to determine when to apply a non-aversive stimulus, when to remove the non-aversive stimulus and when to follow removal of the non-aversive stimulus with an aversive stimulus. The software may further be executable to determine at what intensity to apply the stimulus.

The present exemplary embodiment further provides a method for controlling the location of an animal, the method comprising:

determining a position, velocity and a heading direction of an animal, relative to a target;

applying a non-aversive stimulus if the position of the animal relative to the target is less than a predetermined distance and the velocity of the animal relative to the target is within a predetermined range and the heading direction of the animal is within a predetermined orientation relative to the target; and selectively removing the non-aversive stimulus when either the velocity of the animal relative to the target is outside of the predetermined range, or the heading direction of the animal changes to be outside of the predetermined orientation or the heading direction of the animal changes by more than a predetermined amount, otherwise first removing the non-aversive stimulus then applying an aversive stimulus to the animal.

The method may further comprise generating a signal representative of applying a non-aversive stimulus. Applying a non-aversive stimulus to the animal may comprise emitting an audible tone.

The method may further comprise generating a signal representative of removing the application of the non-aversive stimulus.

The method may further comprise generating a signal representative of first removing the non-aversive stimulus and second applying an aversive stimulus to the animal. Applying an aversive stimulus to the animal may comprise applying an electrical stimulus.

The method may further comprise receiving position information representative of the position of an animal.

The method may further comprise receiving heading direction information representative of the orientation of the animal in order to determine the orientation of the animal based on the received heading direction information.

The method may further comprise determining the position of the animal relative to a target based on the received position information and determining the velocity of the animal relative to the target. The method may further comprise differentiating position information to obtain the velocity of the animal.

The method may further comprise receiving accelerometer data and processing the accelerometer data and position information to refine the position information.

The method may further comprise storing parameters including one or more of: target information comprising co-ordinate data representative of the target, upper and lower limits of the predetermined velocity range, upper and lower limits of the predetermined orientation of the animal relative to the target, a maximum duration of application of the non-aversive stimulus and a maximum duration of application of the stimulus.

The method may further comprise wirelessly receiving comparison parameters including one or more of: target information comprising co-ordinate data representative of the target, upper and lower limits of the predetermined velocity range, upper and lower limits of the predetermined orientation of the animal relative to the target, a maximum duration of application of the non-aversive stimulus and a maximum duration of application of the stimulus.

The method may further comprise wirelessly transmitting variable data comprising one or more of the position and speed at which the animal is moving relative to the target, the heading direction of the animal relative to the target, the extent of application of an aversive and non-aversive stimulus applied to the animal as a function of time, may processed at a frequency of less than 2 Hz or about 2 Hz and stored in memory.

The method may further comprise executing software to determine when to apply a non-aversive stimulus, when to remove the non-aversive stimulus and when to follow removal of the non-aversive stimulus with an aversive stimulus. The method may further comprise executing software to determine at what intensity to apply the stimulus.

The present exemplary embodiment further provides a software program for controlling the location of an animal, where the software program is executable by a processor which operates to continuously determine the position, velocity and a heading direction of an animal relative to a target, the software program comprising:

code for applying a non-aversive stimulus if the position of the animal relative to a target is less than a predetermined distance and the velocity of the animal relative to the target is within a predetermined range and the heading direction of the animal is within a predetermined orientation relative to the target; and code for selectively removing the non-aversive stimulus when either the velocity of the animal relative to the target is outside of the predetermined range, or the heading direction of the animal is outside of the predetermined orientation or the heading direction of the animal changes by more than a predetermined amount otherwise first removing the non-aversive stimulus and second applying an aversive stimulus to the animal.

BRIEF DESCRIPTION OF THE DRAWINGS

An example of the invention will now be described with reference the accompanying drawings, in which.

DETAILED DESCRIPTION OF EXEMPLARY EMBODIMENTS

Figure 1:
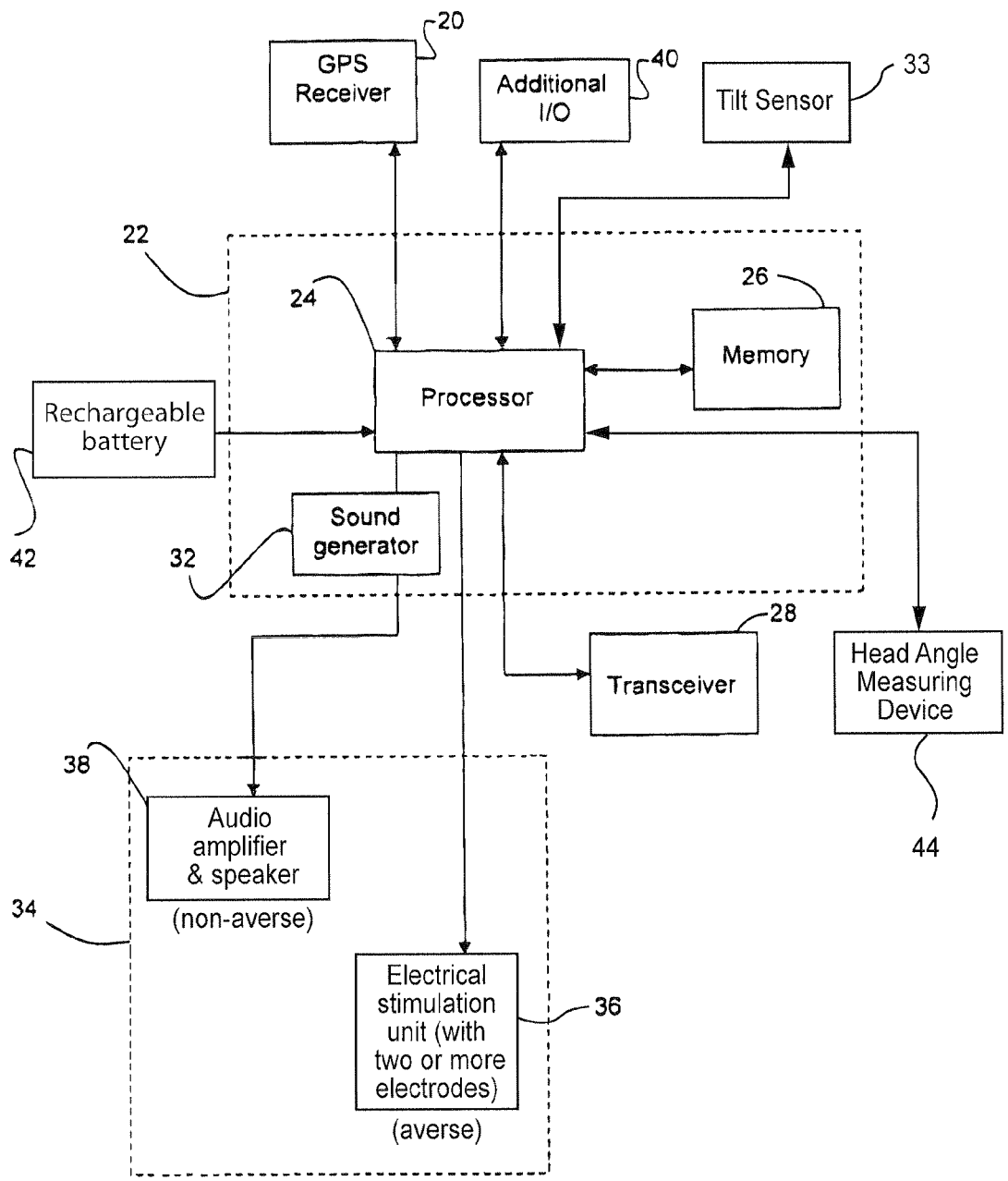
FIG. 1 is a block diagram of the components of a control device for the virtual fencing of an animal.

Referring first to FIG. 1, a schematic diagram of the components of a control device 10 is illustrated. The components of the control device 10 are securely mounted to a collar (not shown) which is to be worn by an animal.

The control device 10 includes a GPS receiver 20 for receiving GPS signals from GPS satellites (not shown) which continuously transmit data signals. A portable computing device 22 is provided having a 206 MHz processor 24 which processes the received GPS signals to provide location information representative of the location of the animal, 64 MB RAM and an additional 128 MB memory 26. All data is processed and written to memory 26 at a frequency of 2 Hz. Memory 26, stores a data structure which contains a variety of parameters including the co-ordinates representative of a target. In this example the target is a static virtual fence defined by a four sided polygon. The co-ordinates (latitude and longitude) of the polygon are stored in the data structure.

While the virtual fence co-ordinates may be entered and/or modified via the portable computing device's user interface (not shown) more preferably the co-ordinates of the virtual fence are wirelessly transmitted from a base (or central) station. To effect such bi-directional communication with a base station a digital RF transceiver 28 is provided which communicates with the base station using serial data communication. The transceiver 28 receives the virtual fence co-ordinates and any other data stored in the data structure of the portable computing device's memory 26. Remote uploading of virtual fencing co-ordinates from a base station is preferable for rotational grazing of animals on large stations. It is also preferable to be able to remotely download data to a base station so that a station manager can monitor the actual position of animals and enable remote mustering.

The processor 24 computes and determines the position of the animal relative to the virtual fence based on the received GPS signals and data stored in memory 26. The processor 24 further computes and determines the speed of movement of the animal based on the differential of location information.

A heading direction detecting means in the form of the GPS receiver 20 provides signals representative of the heading direction (orientation) of the animal. Data output from the GPS receiver 20 is received by the processor 24 which determines the heading direction of the animal relative to the virtual fence co-ordinates stored in memory 26. An electronic compass is further provided (not shown), such as the Honeywell Model HMC6352 two-axis electronic compass. The data obtained from the electronic compass enhances the determination of the heading direction. The electronic compass can be of the type that is tilt compensated (e.g., see typical tilt sensor 33 provided in a three-axis gyroscope) and resists magnetic interference, so that it normally yields a good heading direction.

A stimulus unit 34 is securely attached to the collar which includes an aversive stimulus unit in the form of an electrical stimulation unit 36 and a non-aversive stimulus unit in the form of an audio amplifier and speaker combination 38. The portable computing device 22 communicates with the audio amplifier and speaker combination 38 via a sound generator 32. The processor 24 commands sound generator to generate audible tones for output and amplification by the audio amplifier 34. The electrical stimulation unit 36 is in the form of a pair of spring loaded electrodes in the collar for administering an electric shock to the animal. The control device 10 delivers the appropriate stimulus under programmed control of the processor 24 in response to sensed activity from the GPS receiver 20.

Additional serial communication and analogue/digital interfaces 40 can be used to connect different types of external sensors or additional communication devices such as a bite meter and/or pedometer and/or a head angle measuring device 44, for instance, an electronic inclinometer. Head angles can be indicative of certain types of behavior such as foraging, where the animal's head is angled downward towards the ground. The head angle is measured relative to a reference position corresponding to the head being level with the animal's backbone while looking straight ahead, while a downward titled head angle is denoted negative, an upward tilted head angle positive, a left titled head angle negative and a right titled head angle positive.

The processor 24 is powered via a main rechargeable battery 42. Back up batteries (not shown) may be additionally provided.

Experimentation examined the ability of cattle to associate a non-aversive cue as a conditioning stimulus with an aversive but non-noxious stimulus in the form of an electric shock (unconditioned stimulus or reinforcer). Initial studies examined if access of cattle to a location can be controlled by the application of a conditioned stimulus.

Manual Application of Stimuli Experiments

The first study was conducted to identify an effective audio cue as a non-aversive stimulus. The audio cue was a constant polyphonic tone (with a mean frequency of approximately 784 Hz) and the shock intensity was set to 600V at 250 mW. The stimuli were delivered by remote control to GPS collars on five heifers to prevent access to an exclusion zone surrounding a feed trough. An audio cue was administered when the animal entered the exclusion zone, followed by a single application of an electric shock for a maximum of three seconds if the animal continued to proceed. There was an increase in the proportion of heifers responding favourably to the audio cue by turning, backing up or stopping in the third of fourth sessions (73%) compared with the first or second sessions (44%). This indicated that cattle associated the audio cue with the electric shock and learned to avoid the trough.

In this first study, the feed attractant was used to ensure sufficient attempts of animals to cross into the exclusion zone in a minimum time. However the use of the visual cue introduces uncertainty as to whether the heifers associated the electric shock with the audio cue or with the location.

The main study examined whether cattle location can be controlled by an audio conditioned stimulus without the presence of a visual cue. This is important as the stimuli need to be applied in response to the animal's behaviour behavior rather than just its location. In this study there were three distinct fencing configurations. The experiment was conducted over a three week period using 22 heifers and each week had a different fence configuration. The purpose of the first two weeks of the experiment was to observe the learning process through which the heifers learned the association between an audio conditioned stimulus and an electric shock reinforcer. In week 3, the effect of dispensing with the conditioned stimulus was tested. Heifers were randomly allocated to two treatments groups (n=11 per treatment). Animals in treatment group 1 received an audio cue and an electric shock on exclusion zone entry, as in the first two weeks. Animals in treatment group 2 received no audio cue and only an electric shock on exclusion zone entry.

Table 1 illustrates that there was a difference in the behaviors shown in response to both the audio and shock stimuli between weeks 1 and 2, with more heifers turning in response to the audio cue in week 2 than in week 1.

TABLE 1

Counts of behavioral responses.

| Count of response | Audio | | Shock | |
|---|---|---|---|---|
| | Week 1 | Week 2 | Week 1 | Week 2 |
| Turn away | 7 | 24 | 93 | 35 |
| Back up | 0 | 0 | 16 | 16 |
| Stop | 37 | 24 | 0 | 0 |
| Continue Forward | 117 | 61 | 10 | 11 |
| Total approaches to exclusion zone | 161 | 109 | 119 | 62 |

When the virtual fence was moved in week 2, 80% of animals ignored the first audio cue, but the proportion failing to respond to the second audio dropped to 46%, indicating that animals had learned to avoid the electric shock by responding to the audio cue alone to remain within the virtual fence boundary. In week 3, heifers received significantly fewer shocks when a conditioned stimulus was used. The heifers in the shock only treatment group received significantly more shocks (t=4.2, d.f=12.1, P<0.01, Chen's d=1.82) but there was no difference in the total number of stimuli received (t=0.46, d.f=17.7 Cohen's d=0.21). There were no differences between treatments in scores for effectiveness of the fence, appropriateness of the stimulus and adverse responses. This study demonstrated that the appropriate use of an audio cue is an effective conditioned stimulus for virtual fencing of cattle. Full details of the experiments, the results of which are incorporated herein by reference are described in Lee, Caroline et al., *Associative learning by cattle to enable effective and ethical virtual fences*, Applied Animal Behaviour Science 119 (2009) 15-22.

Automated Algorithm Study and Methodology

The method of virtual fencing in accordance with this embodiment of the invention required cattle to learn an association between a non-aversive audio stimulus (a conditioning stimulus) and an aversive electric shock stimulus (an unconditioned stimulus or reinforcer) so they can exhibit the desired behavior of remaining within the virtual boundary in response to the audio stimulus alone.

The experiment used five 18-month-old Hereford heifers that were trained to respond to an audio cue to avoid receiving an electric shock. Animals were fitted with dummy collars for two weeks prior to the demonstration to familiarize them with the collars and prevent animals from associating the collars with the cues. Cattle had no supplementary feed for twelve hours prior to testing and, in the morning, were moved to a handling yard for removal of dummy collars and fitting of collars containing a control device 10. A rectangular experimental paddock of the same dimensions as for the manual study, was sown with oats, was lush and green. There was no visual indication of the exclusion zone which was located at one end of the paddock and defined by a four sided polygon having an area of 16×30 meters.

Figure 2:
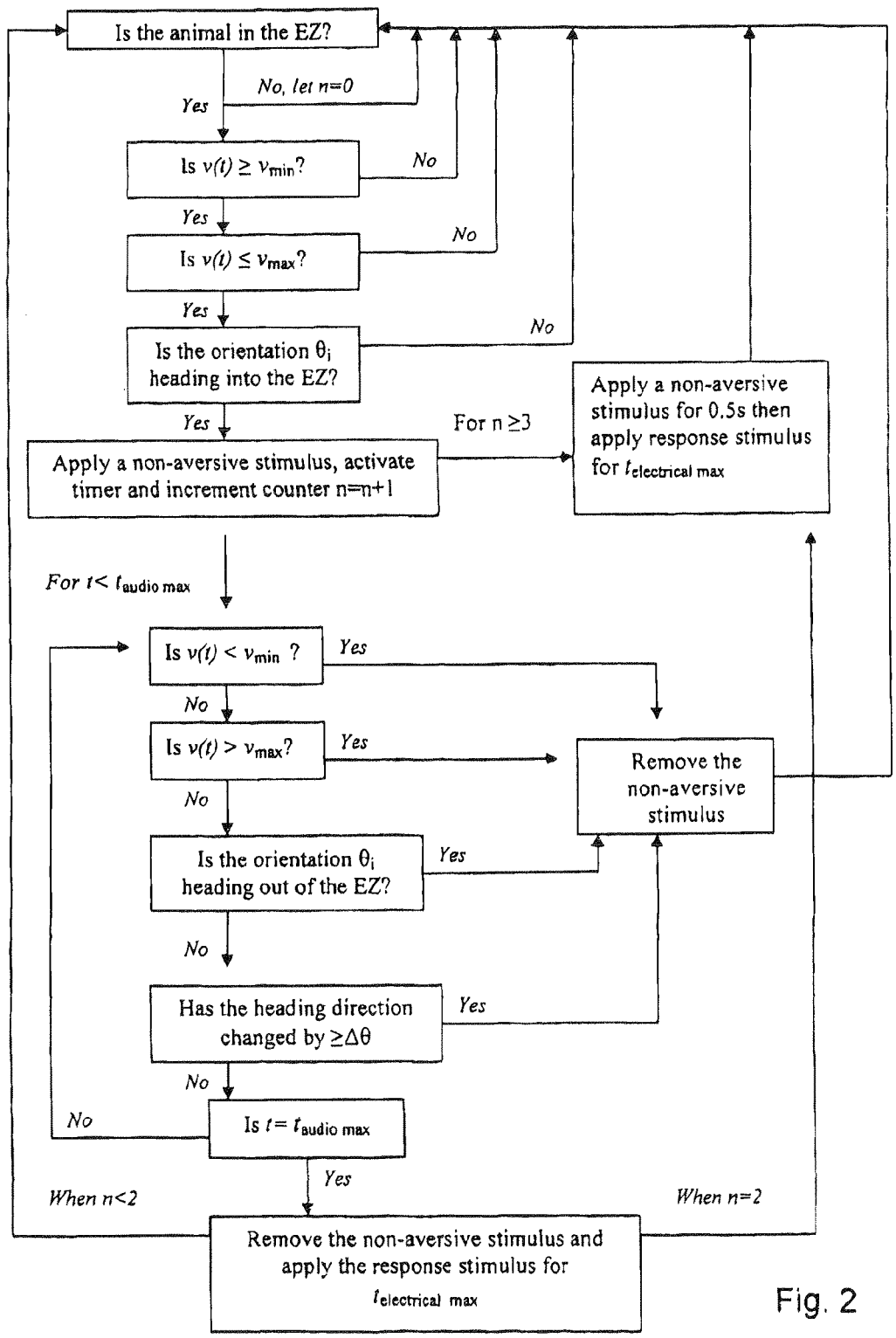
FIG. 2 is a flow diagram showing the steps performed in a particular implementation.

The device illustrated in FIG. 1 is programmed in a manner such that the behavioral state of the animal is assessed to determine when a non-aversive stimulus should be applied and removed and if and when an aversive stimulus should be applied or removed. FIG. 2 refers to the sequence of executable programmable steps.

Set parameters were entered into the memory's data structure. Set parameters included:
the co-ordinates (latitude and longitude) defining the exclusion zone (EZ),
a minimum speed $v_{min}=20$ cms$^{-1}$, a maximum speed $v_{max}=200$ cms$^{-1}$ defined as a speed beyond which the animal is deemed to be in a state of distress, $\theta_{min}=-90°$ defined as the lower limit of the predetermined orientation of the animal relative to the target, $\theta_{max}=+90°$ defined as the upper limit of the predetermined orientation of the animal relative to the target, $\Delta\theta=45°$ defined as the predetermined amount of change in the orientation of the animal relative to the target, $t_{audio\ max}=2.5$ seconds, defined the maximum duration of the audio stimulus, and $t_{electric\ max}=1$ second, defined the maximum duration of application of the electrical stimulus.

In the experiment, animals were introduced into the paddock at 7 am and remained until 5 pm. The animals were video taped. Data including the GPS position of each animal, the speed v(t) at which the animal was moving and the heading direction of the animal relative to the virtual fence, the extent of application of the audio cues and electric shock stimuli applied to each animal as a function of time, were all processed at a frequency of 2 Hz and stored in the memory's data structure for the entire period. Upon completion of the demonstration the collars were removed and animals were returned to their home paddock as a group.

With reference to FIG. 2 an audio stimulus, having a maximum duration of 2.5 seconds, was applied if and only if the following four conditions are satisfied:

1. The distance between the animal and the virtual fence is <0 cm (a negative distance referring to the presence of the animal within the exclusion zone) AND;
2. The speed at which the animal is moving $v(t)>v_{min}$ AND;
3. The speed at which the animal is moving $v(t)<v_{max}$ AND;
4. The animal's heading direction points into the exclusion zone $\theta_i \in [\theta_{min}, \theta_{max}]$ The audio ceased earlier than audio max if the animal responded by any one of the following:

5. The animal reduces their speed such that $v(t)<v_{min}$ OR;
6. The animal increases their speed beyond the flight speed $v(t)>v_{max}$ OR;
7. The animal changes their direction so that their heading direction points out of the exclusion zone i.e. $\theta_i<\theta_{min}$ or $\theta_i>\theta_{max}$, OR;
8. The animal changes their direction heading from the previous direction heading reading by an amount greater than or equal to $\Delta\theta$.

If the animal did not respond to the application of the audio stimulus, resulting in the application of the audio for the maximum duration of 2.5 seconds, then the application of the audio stimulus was withdrawn and the animal received an electric shock (600V, 250 mW) for duration of one second.

The algorithm then went back to the original test (points 1-4) to determine if an audio cue should be reapplied.

To account for grazing behavior, where cattle slowly move into the exclusion zone and respond to the audio alone on numerous occasions and thus avoid receiving an electric shock, an additional criterion was built into the algorithm. This criterion was that if an animal had received two audio stimuli and still remained in the exclusion zone, then on the next forward movement, it would receive a 0.5 seconds audio cue followed immediately with by an electric shock. Only when the animal moved out of the exclusion zone would the maximum audio duration be returned to the value of 2.5 seconds.

It should be appreciated that the parameters which define the exclusion zone, and which are stored to memory, can be programmed to change with time. Optionally, or in addition, the parameters which define the exclusion zone can be moved in response to animal parameters, such as the position of an animal.

If an animal exhibits a flight response to either the audio or shock stimuli, then the cue ceases immediately. If the animal attempts to move further into the EZ then the algorithm will be reset to administer stimuli as described above. The animal is unlikely to continue to move further into the EZ if the balance of cattle numbers are contained behind the virtual fence boundary and will most likely rejoin the balance of the group.

Results

The algorithm was highly effective with all five animals remaining within the virtual fence boundary for the 10 hour duration of the trial. Most animals responded by turning in response to the audio cue alone, however, on occasion some cattle tested the fence boundary and received audio and shock stimuli.

It will be appreciated by persons skilled in the art that numerous variations and/or modifications may be made to the invention as shown in the specific embodiments without departing from the scope of the invention as broadly described. For instance, memory 26 may include sound files stored in a suitable format such as WAV format. The processor 24 may select an appropriate sound file for amplification.

The present embodiments are, therefore, to be considered in all respects as illustrative and not restrictive. One skilled in the art will understand that the orientation tracking accomplished by the GPS receiver or electronic compass can be performed by mounting a video camera on the animal. In addition, the control device may receive differential GPS signals from an appropriate source to improve the accuracy and precision of the GPS system. When the target takes the form of a virtual fence, the target may be a traditional straight line or a curved contour, to follow, for instance the contour of a river bank. Still further the virtual fence may take the form of a polygon. A static virtual fence can be used to enforce a designated grazing area for a herd of animals. Optionally a dynamic virtual fence can be created by gradually shifting the co-ordinates of the fence. The results of this include the rotational or strip grazing of a herd of animals.

What is claimed is:

1. A control device for controlling the location of an animal, the control device comprising:

a GPS receiver for receiving GPS signals;

a processor communicatively coupled to the GPS receiver and configured to continuously determine the position, velocity and heading direction of the animal relative to a target;

a stimulus unit for selective application of a stimulus to the animal in response to signals received from the processor;

wherein the processor configuration is programmed such that if the position of the animal relative to the target is less than a predetermined distance and the velocity of the animal relative to the target is within a predetermined range and the heading direction of the animal is within a predetermined orientation relative to the target, then a signal indicative of applying a non-aversive stimulus to the animal is generated, and the processor configuration is further programmed such that (A) if within a predetermined period of time (i) the velocity of the animal relative to the target is outside of the predetermined range or (ii) the heading direction of the animal changes by more than a predetermined amount, a signal indicative of removal of the non-aversive stimulus is generated, and (B) otherwise a signal is generated indicative of first removing the non-aversive stimulus followed by application of an aversive stimulus to the animal, wherein the non-aversive stimulus is a conditioning stimulus and the aversive stimulus is one of (a) an unconditioned stimulus or (b) a reinforcer.

2. The control device according to claim 1 further comprising a heading direction detection means to detect or refine the heading direction of the animal and provide a corresponding heading signal.

3. The control device according to claim 2 where the heading direction detecting means is one of a terrestrial magnetism sensor, a magnetic compass, an additional GPS receiver, and an electronic compass.

4. The control device according to claim 3 further comprising a tilt sensor communicatively coupled to the processor, where the tilt sensor is operable to increase the control device's accuracy in determining the heading direction of the animal.

5. The control device according to claim 1 further comprising a memory unit to store spatial and temporal comparison parameters, such parameters including target information comprising:
co-ordinate data representative of the target,
an upper and a lower limit of the predetermined velocity range relative to the target,
an upper and a lower limit of the predetermined orientation of the animal relative to the target,
a maximum duration of application of the non-aversive stimulus, and
a maximum duration of application of the stimulus.

6. The control device according to claim 1 further comprising a transceiver in communication with the processor and the memory unit to receive target information remotely.

7. The control device according to claim 1 where the stimulus unit comprises a non-aversive stimulus unit and a separate aversive stimulus unit.

8. The control device according to claim 7 where the non-aversive stimulus unit administers a non-aversive stimulus which comprises a tone that is audible to the animal.

9. The control device according to claim 7 where the non-aversive stimulus unit administers a non-aversive stimulus which comprises a vibrational stimulus.

10. The control device according to claim 7 where the aversive stimulus unit administers an aversive stimulus which comprises an electrical stimulus.

11. The control device according to claim 10 where the aversive stimulus unit includes two or more electrodes for electrical contact with the skin of the animal.

12. The control device according to claim 1 where the control device further comprises a rechargeable power supply for powering the control device's components, where the power supply is rechargeable by using the potential electrical energy generated by the animal's movement.

13. The control device according to claim 1 where the control device further comprises a head angle measurement device coupled with the processor for measuring the head angle of the animal relative to a reference position and/or orientation.

14. A method for controlling the location of an animal, the method comprising:
determining a position, velocity and a heading direction of an animal, relative to a target;
applying a non-aversive stimulus when the position of the animal relative to the target is less than a predetermined distance and the velocity of the animal relative to the target is within a predetermined range and the heading direction of the animal is within a predetermined orientation relative to the target; and
selectively removing the non-aversive stimulus if within a predetermined period of time:
(i) the velocity of the animal relative to the target is outside of the predetermined range; or
(ii) the heading direction of the animal changes to be outside of the predetermined orientation; and
(iii) the heading direction of the animal changes by more than a predetermined amount;
otherwise first removing the non-aversive stimulus then applying an aversive stimulus to the animal;
wherein the non-aversive stimulus is a conditioning stimulus which is distinct and different in type from the aversive stimulus which is one of (a) an unconditioned stimulus or (b) a reinforcer.

15. The method according to claim 14 further comprising generating a signal representative of applying a non-aversive stimulus.

16. The method according to claim 15 where applying a non-aversive stimulus comprises emitting a tone that is audible to the animal.

17. The method according to claim 14 further comprising generating a signal representative of firstly removing the non-aversive stimulus and secondly applying an aversive stimulus to the animal.

18. The method according to claim 17 where the step of applying an aversive stimulus to the animal comprises applying an electrical stimulus.

19. The method according to claim 18 further comprising receiving accelerometer data and processing the accelerometer data and position data to refine the position information.

20. The method according to claim 14 further comprising the step of receiving position data and heading direction data respectively representative of the position and orientation of the animal.

21. The method according to claim 20 further comprising differentiating position data to obtain the velocity of the animal relative to the target.

22. The method according to claim 14 further comprising wirelessly receiving spatial and temporal comparison parameters comprising:
co-ordinate data representative of the target,
an upper and a lower limit of the predetermined velocity range relative to the target,
an upper and a lower limit of the predetermined orientation of the animal relative to the target,
a maximum duration of application of the non-aversive stimulus, and
a maximum duration of application of the stimulus.

23. The method according to claim 22 further comprising determining at what intensity to apply the non-aversive stimulus.

* * * * *